(12) United States Patent
Persidsky

(10) Patent No.: US 11,398,993 B2
(45) Date of Patent: Jul. 26, 2022

(54) TWO-PART MESSAGING WITH SPECIFIED DELAY

(71) Applicant: Andre Maxim Persidsky, San Francisco, CA (US)

(72) Inventor: Andre Maxim Persidsky, San Francisco, CA (US)

( * ) Notice: Subject to any disclaimer, the term of this patent is extended or adjusted under 35 U.S.C. 154(b) by 0 days.

(21) Appl. No.: 16/882,442

(22) Filed: May 23, 2020

(65) Prior Publication Data
US 2022/0060436 A1    Feb. 24, 2022

Related U.S. Application Data

(60) Provisional application No. 62/852,311, filed on May 24, 2019.

(51) Int. Cl.
| | | |
|---|---|---|
| *G06F 3/0482* | (2013.01) | |
| *H04L 51/046* | (2022.01) | |
| *H04L 9/40* | (2022.01) | |
| *G06F 3/04847* | (2022.01) | |
| *G06F 16/22* | (2019.01) | |

(52) U.S. Cl.
CPC .......... *H04L 51/046* (2013.01); *G06F 3/0482* (2013.01); *G06F 3/04847* (2013.01); *H04L 63/123* (2013.01); *G06F 16/22* (2019.01)

(58) Field of Classification Search
CPC ... H04L 51/046; H04L 63/123; G06F 3/0482; G06F 3/04847
See application file for complete search history.

(56) References Cited

U.S. PATENT DOCUMENTS

| | | | |
|---|---|---|---|
| 7,017,292 | B1 | 3/2006 | Abelarde |
| 9,443,231 | B2 | 9/2016 | McPhee |
| 9,742,836 | B2 | 8/2017 | Zhang et al. |
| 2014/0280588 | A1* | 9/2014 | McPhee ................. H04L 51/214 709/204 |
| 2017/0142214 | A1* | 5/2017 | Nanavati ............ G06Q 30/0251 |
| 2017/0149706 | A1* | 5/2017 | Amble .................. H04L 67/306 |
| 2018/0097752 | A1* | 4/2018 | Yates .................... H04L 51/214 |

FOREIGN PATENT DOCUMENTS

| | | |
|---|---|---|
| WO | WO2005015927 A1 | 2/2005 |
| WO | WO2014068148 A1 | 5/2014 |
| WO | WO2018146669 A1 | 8/2018 |

* cited by examiner

*Primary Examiner* — Anil K Bhargava
(74) *Attorney, Agent, or Firm* — Stephen E. Zweig

(57) ABSTRACT

Examples for messaging with a specified delay by a system are described. In an example, the system comprises a server coupled to at least one user device. The server may receive a messaging information from a first user device. The messaging information may include a first and a second message and a timing information. The server generates a computing resource for the first message and the second message, and enables access to the first and the second message based on the timing information. For example, the first message is made accessible at a first access time that is previous to a second access time at which the second message is made accessible.

15 Claims, 8 Drawing Sheets

TWO-PART MESSAGING WITH SPECIFIED DELAY

CROSS-REFERENCE TO RELATED APPLICATIONS

This application claims the priority benefit of U.S. provisional patent application No. 62/852,311 filed May 24, 2019, titled "Two part messaging platform with selectable delay"; the entire contents of the application is incorporated herein by reference.

TECHNICAL FIELD

The present disclosure relates generally to messaging platforms; and more specifically, to systems and methods for messaging with a specified delay.

BACKGROUND OF THE INVENTION

In recent years, scheduling platforms (or software) have been frequently employed for scheduling the sending of messages at a future point in time. Specifically, a scheduling platform enables a sender to specify a date and a time in the future for sending a message. Such delayed messages may be sent over e-mail, SMS, text messaging, mobile apps, IP messaging platforms, and the like. Subsequently, the scheduling platform automatically sends the message to a receiver at the specified date and time.

The scheduling platform, for example, can make communication with a receiver in another time-zone more convenient. Typically, by scheduling the date and time for sending the message, the sender is freed from having to send the message in real-time at a time that may be inconvenient, as well as reduces any chance of mistakenly forgetting to send the message.

However, conventional scheduling platforms do not always guarantee reliable accessibility of the message. For example, the delivery of a message may be interrupted due to a change in the receiver's communication link, such as an e-mail address, phone number, and the like. This case may be exacerbated by the fact that certain scheduling platforms allow the sender to specify a date and time for delivery of the message far into the future, for example, after one or more years. Furthermore, in many cases, the receiver may not be aware of the message scheduled by the sender. In such a case, the message may not be successfully delivered to the receiver, as the message may be prone to, for example, being overlooked, sent to spam, disregarded by the receiver, and so forth.

Therefore, in the light of the foregoing discussion, there exists a need to overcome aforementioned drawbacks associated with conventional scheduling platforms for sending messages.

SUMMARY OF THE INVENTION

In one aspect, an embodiment of the present disclosure provides a system for messaging with a specified delay, the system comprising a server, the server being coupled to at least one user device, wherein the server:
  receives a messaging information from a first user device, wherein the messaging information comprises a first message, a second message, and a timing information;
  generates a computing resource for the first message and the second message; and
  enables access to the first and the second message based on the timing information, wherein
    the first message is made accessible at a first access time that is previous to a second access time at which the second message is made accessible.

In another aspect, an embodiment of the present disclosure provides a method for messaging with a specified delay, the method comprising:
  receiving a messaging information from a first user device, wherein the messaging information comprises a first message, a second message and a timing information;
  validating the received messaging information;
  generating a computing resource to the first message and the second message; and
  enabling access to the first and the second message based on the timing information.

The method is implemented using a system, wherein the system comprises a server coupled to at least one user device. For example, the server may be coupled to a first user device associated with a sender and a second user device associated with a receiver.

In yet another aspect, an embodiment of the present disclosure provides a non-transitory computer-readable medium comprising instructions executable by a processing resource for messaging with a specified delay, wherein the processing resource:
  receives a messaging information from a first user device, wherein the messaging information comprises a first message, a second message, and a timing information;
  generates a computing resource to the first message and the second message; and
  enables access to the first and the second message based on the timing information, wherein
    the first message is made accessible at a first access time that is previous to a second access time at which the second message is made accessible.

Additional aspects, advantages, features, and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
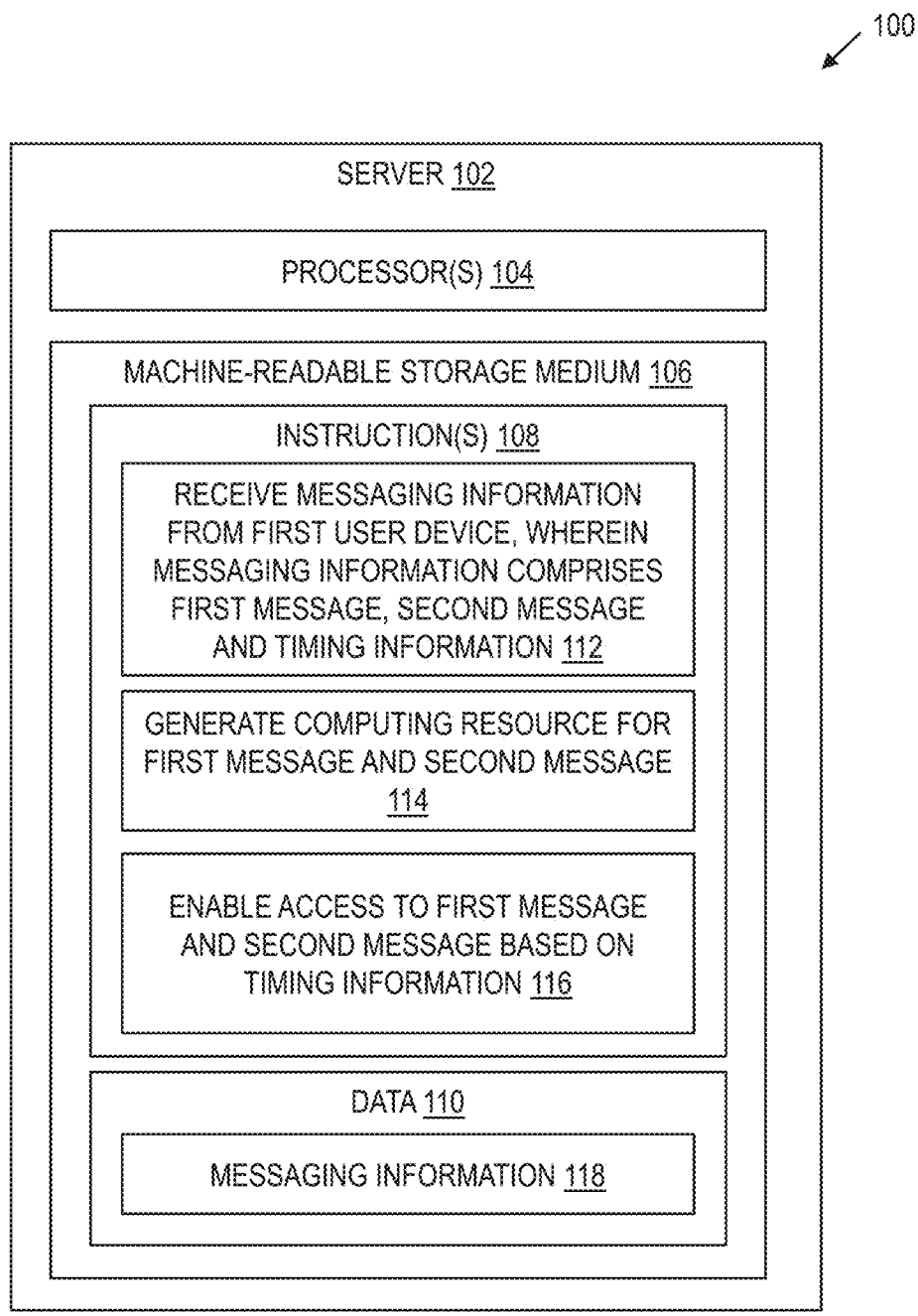
FIG. 1 is an illustration of a system for messaging with a specified delay, as per an example.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE INVENTION

The present disclosure seeks to provide a system and method for messaging with a specified delay. The present disclosure aims to provide a solution to the existing problem of unreliable delivery of a scheduled message, such as due to change of a communication link of the receiver. An aim of the present disclosure is to provide a solution that overcomes at least partially the problems encountered in the prior art by providing a system that enables a sender to create and schedule a two-part message, wherein the server ensures that the two-part message is reliably accessible with the specified delay.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Embodiments of the present disclosure substantially eliminate or at least partially address the aforementioned problems in the prior art, by enabling a sender to create and schedule a two-part message with a specified delay. The specified delay prescribes a time interval between making a first message and a second message accessible. In an example, the first message (may also be referred to as, teaser message) may form an introduction message which a receiver can immediately view, prior to viewing of a second message (may also be referred to as, reveal message) after it becomes accessible. Consequently, making the first message accessible before the second message provides an in-advance reminder or notice to a receiver, to be aware of the upcoming second message, reducing instances of oversight of such a message. Such a specified delay may also create a desirable state of suspense and intrigue for the receiver and thus may increase interest in the contents of the scheduled second message.

The system generates a computing resource for the first and the second messages, wherein the second message is made accessible to the receiver at the computing resource after the specified delay. Such a computing resource may be previously or immediately provided to the receiver, ensuring that the receiver may access the second message even in the distant future, regardless if the communication link of the receiver has changed.

Advantageously, the present subject matter provides a new communication platform between two or more participants, wherein the specified delay may be known to the participants in advance. The platform may create a sense of suspense and intrigue, in anticipation of the second message being revealed.

Notably, the message refers to a verbal, written or recorded communication. Pursuant to the present disclosure, the message may be an electronic communication. Further, the message may be in form of, for example, text, image, audio, video, GIF, animation, and so forth. As would be understood, a message is typically sent by a sender and is intended to be received by a receiver. In the present disclosure, the sender may be a user of a first user device, whereas the receiver may be a user of a second user device. It is to be noted that a user may be a person or a bot.

For example, the present subject matter may be employed for scheduling of accessibility of a message at a near or distant time in future. Examples of events during which the present subject matter may be implemented may include, but are not limited to, birthdays, anniversaries, holidays, surprises, e-gifts, reminders, tickets, invitations, special events, product launches, marketing messages, business announcements, confessions, pranks, and personal announcements.

In operation, a sender, i.e., the user of the first user device, may create and schedule a message to be accessed by the receiver, i.e., the user of the second user device. In accordance with the present disclosure, the message is constituted in the messaging information. In this regard, the messaging information includes a first message, a second message, and timing information. In an example, the sender may upload the messaging information using a user interface of the system, that may be displayed on a display of the first user device. Subsequently, the messaging information is received by the server, wherein the server may validate and store the messaging information.

Thereafter, the server may process the messaging information. For example, the server may generate a computing resource for the first and the second message. In an example, the computing resource may be an address on the Internet (such as a Uniform Resource Locator (URL), name, or a combination thereof), necessary supportive bandwidth, storage, database entries, processing power (for example, CPU processing power), a screen within a software application, and the like. In an implementation, a single URL may be generated for accessing the first and the second message. Further, the first and the second message along with the URL may be stored within a database of the server. Furthermore, the server may identify, from the timing information, a first access time at which the first message is to be made accessible, and a second access time at which the second message is to be made accessible. In certain cases, the timing information may include only the second access time. In such case, the first message may be made accessible at the first access time that may be instantly after generating the URL.

For example, a URL is generated for the first and the second message, wherein the URL points to a web page for accessing the first message and the second message. Further, on such a web page, the second message is made accessible at the second access time, wherein the second access time is a time in the future with respect to the first access time at which the first message is made accessible.

Once the first message is made accessible, the server may identify if the second access time for the accessibility of the second message is absolute or relative. In an example, the identification may be made based on timing information provided by the sender, within the messaging information. As would be understood, the sender may specify a nature of the second access time while creating and scheduling the two-part message via the first user device. In one example, when the second access time may be absolute, the server may initiate a countdown timer for the second access time upon creation of the complete two-part message, i.e., receiving the messaging information from the sender, and generating the computing resource for the first and the second message, and providing accessibility for the first message. In another example, when the second access time may be relative, the countdown timer may initiate a countdown for the second access time only upon the receiver viewing the first message or accessing of the related computing resource. Further, the countdown timer for accessing the second message may be set in terms of, for example, seconds, minutes, hours, days, years, or a combination thereof. Thereafter, the server may make the second message accessible to the receiver, at the second access time, that may correspond to a time when the countdown timer for the second message reaches '0'.

In an implementation, the computing resource for the first and the second message, such as the URL, may be provided to the sender. The sender may, using the first user device, copy the computing resource. Further, the sender may manually or in an automated manner transmit (or send) the computing resource to a second user device associated with the receiver. The sender may send the URL by way of for example, text, SMS, email, post on a social network, or provide the URL into a mobile messaging app that both the sender and receiver may use for communication.

The above examples are further described in conjunction with appended figures. It should be noted that the description and figures merely illustrate the principles of the present subject matter. It will thus be appreciated that various arrangements that embody the principles of the present subject matter, although not explicitly described or shown herein, may be devised from the description, and are included within its scope.

Referring to FIG. 1, there is shown an illustration of a system 100 for messaging with a specified delay, as per an example. The system 100 includes a server 102. Further, the server 102 includes processor(s) 104, and machine-readable storage medium 106 coupled to and accessible by processor(s) 104. The machine-readable storage medium 106 stores instruction(s) 108 and data 110, that are accessible by the processor(s) 104. The system 100 may be implemented as a computing device or as a remote server. In an example, the server 102 may be a computing device for generating and storing of a computing resource, such as a URL for a two-part message, wherein the two-part message is to be made accessible with a specified delay between a first and a second message. Although not depicted, the server 102 may include other components, such as interfaces, to communicate over network with external storage or user devices, display, input/output interfaces, operating systems, applications, and the like, which have not been described for brevity.

The processor(s) 104 may be implemented as a dedicated processor, a shared processor, or a plurality of individual processors, some of which may be shared. The machine-readable storage medium 106 may be communicatively connected to the processor(s) 104. The processor(s) 104 may fetch and execute computer-readable instructions (referred to as, instruction(s) 108) stored in the machine-readable storage medium 106. The machine-readable storage medium 106 may include any non-transitory computer readable medium including, for example, volatile memory such as RAM, or non-volatile memory such as EPROM, flash memory, hard disk, and the like.

Further, the system 100 (and thus, the server 102) may be coupled to at least one user device (not shown in FIG. 1), such as a first user device and a second user device. Typically, a user device is an electronic device associated with (or used by) a user that is capable of enabling the user to perform specific tasks associated with the aforementioned system. The user device may be broadly interpreted to include any electronic device that may be used for voice and/or data communication over a wireless communication network. Examples of the user device include, but are not limited to, cellular and mobile phones, personal digital assistants (PDAs), handheld devices, tablets, wireless modems, laptop computers, personal computers, desktop computers, smart watches, etc. Additionally, the user device may include, for example, a casing, a memory, a processor, a network interface card, a microphone, a speaker, a keypad, and a display. As mentioned previously, the first user device may be associated with a sender of a messaging information 118, while the second user device may be associated with a receiver of messaging information 118.

In operation, the processor(s) 104 may fetch and execute instruction(s) 108 to enable creation and scheduling of the two-part message with a specified delay. In an example, the instruction(s) 108 may include instruction 112 to receive the messaging information 118 from the first user device (or the sender). In the present example, the messaging information 118 may include a first message, a second message, and timing information. The first and the second message may constitute two-part message. For example, the first message may be a teaser message, whereas the second message may include a reveal message (or information). Further, the timing information may specify a second access time at which time the second message is to be made accessible to the second user device (or the receiver). Optionally, timing information may also specify a first access time for when to provide access to the first message. It may be noted that the access time defined in the timing information may be an absolute date and time or a relative date and time as previously described. The messaging information 118 received from the first user device may be stored within the machine-readable storage medium 106 of the server 102, as messaging information 118.

Continuing further, the instruction(s) 108 may include instructions 114 to generate a computing resource for the first message and the second message. For example, the computing resource may be an identifier, a name, a location such as an address on the internet (such as a Uniform Resource Locator (URL), name, or a combination thereof), necessary supportive bandwidth, storage, database entries, processing power (for example, CPU processing power), a screen within a software application, and the like. The instructions(s) 108 may include instructions 116 for enabling access to the first and the second message, using the timing information at the generated computing resource. In an example, the first message may be made accessible at first access time that may be instantaneous to receiving the messaging information 118. Alternatively, first access time, at which the first message is to be made accessible, may be specified in the timing information of the messaging information 118.

In response to making the first message accessible to the receiver via the second user device, instructions 116 may also be executed for scheduling accessibility for the second message. In an example, the server 102 may initiate a countdown timer for the second access time after making the first message accessible at the first access time. In certain cases, the countdown timer may be initiated when the first message is accessed or viewed, for example, by the receiver. Specifically, the countdown timer may set a countdown at the end of which the second message is to be made accessible. Furthermore, when the countdown timer reaches '0', then the server 102 may enable access to the second message. It may be noted that the first access time at which the first message is made accessible is prior the second access time at which the second message is made accessible, and as previously mentioned, the first access time may be omitted or correspond to a time at which the two-part message is created by the sender.

In the manner as described above, the two-part message may be transmitted to the receiver, via the second user device and computing resource. It may be noted that above approaches are provided in conjunction with several examples. However, the scope of the present subject matter should not be limited to only said examples. The other examples and the additional aspects are further described in conjunction with the remaining examples.

Figure 2:
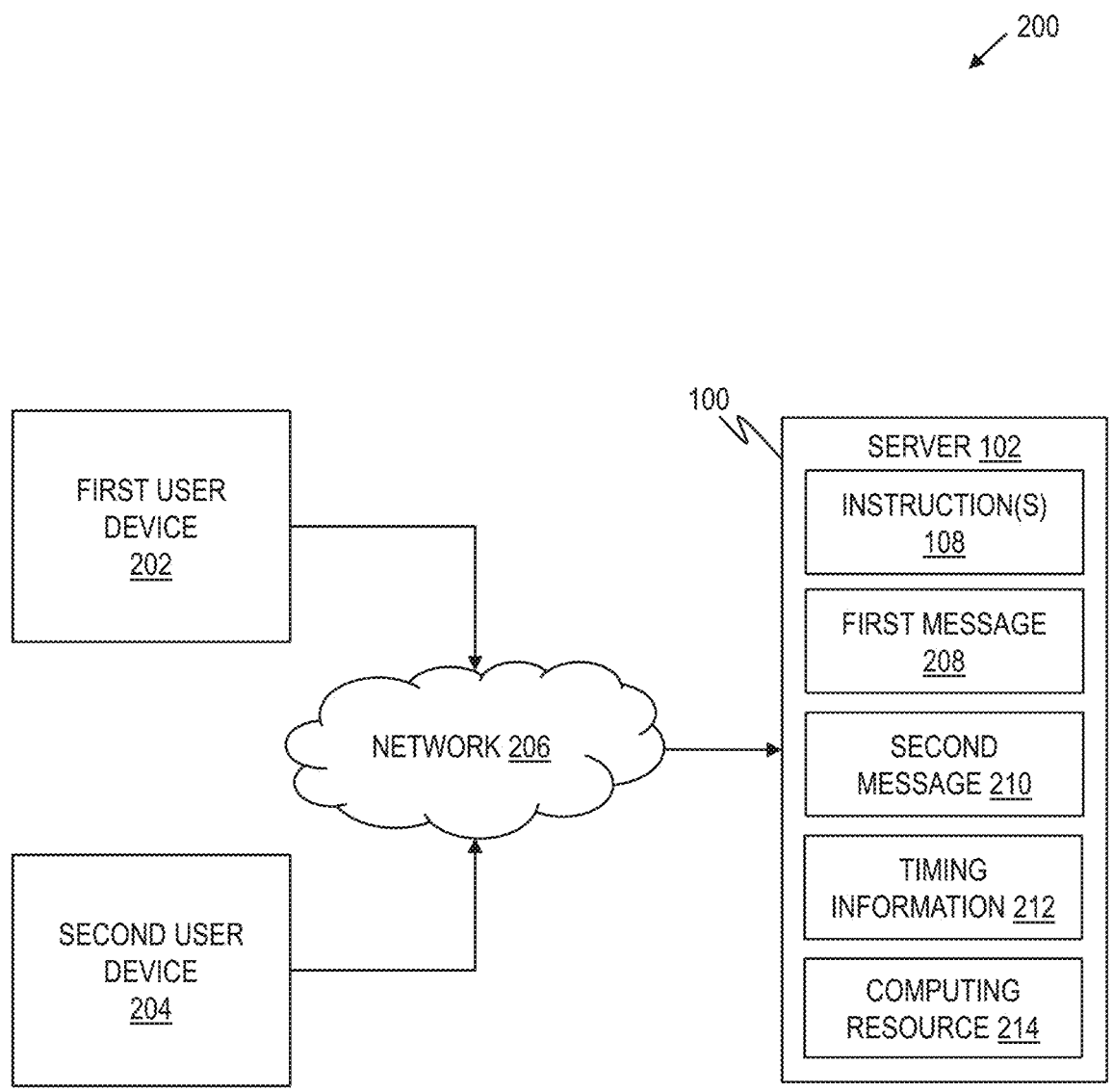
FIG. 2 is an illustration of an environment where a system for messaging with a specified delay is implemented, as per an example.

Referring to FIG. 2, there is shown an illustration of an environment 200 where a system 100 for messaging with a specified delay is implemented, as per an example. The environment 200 includes the system 100, a first user device 202 and a second user device 204. The first user device 202 may provide the messaging information 118 for transmission to the second user device 204. The server 102 of the system 100 may consequently handle the received messaging information 118 and transmit the two-part message to the second user device 204 with specified delay.

The system 100 (and thus, the server 102), the first user device 202 and the second user device 204 may be communicatively coupled to each other via a network 206. The network 206 may be a private network or a public network, such as an intranet or the internet, and may be implemented as a wired network, a wireless network, or a combination thereof.

The server 102 may include instruction(s) 108 for performing operations associated with the server 102. In an example, the instruction(s) 108 may be fetched from machine-readable storage medium 106 and executed by processor(s) 104 included in the server 102 to cause the server 102 to perform various functions as described. Pursuant to present subject matter, the instruction(s) 108 may be fetched and executed on receiving the messaging information 118 from the first user device 202, for transmission to the second user device 204.

In operation, the server 102 of the system 100 receives the messaging information 118 from the first user device 202. In an example, the messaging information 118 includes a first message 208 and a second message 210. It may be noted that the first 208 and the second 210 message may constitute two-part message which is to be transmitted with a specified delay. Such delay may be prescribed within timing information 212 in the messaging information 118. The timing information 212 may also include at least one of: first access time, second access time, a nature of the second access time (such as, absolute or relative), a specified delay between the first and the second access time, calendar information (such as, date, year, and the like) pertaining to the first and the second access time. Herein, the first access time corresponds to a time at which the first message 208 is to be made accessible, and the second access time corresponds to a time at which the second message 210 is to be made accessible. In certain cases, only second access time may be provided.

For example, the first message 208 may be a teaser (or an introductory) message, whereas the second message 210 may include a reveal message (or true or final information). Such a teaser message and reveal message may be implemented as two-part message. The present subject matter is further explained in conjunction with such an example. However, the present example is only indicative and should not be construed as limiting in any way. In another implementation of the present subject matter, both the first 208 and the second 210 message may include reveal information, in parts. In yet another implementation, the system may operate for a three-part message, four-part message, and the like, wherein a chain of reveal messages, each with their own access time and countdown timer, could be provided as part of an overall multi-part message.

Further, the server 102 may be implemented as a web page, a software application, or both. Moreover, the computing resource generated for the first 208 and the second 210 message may also be implemented as a web page or a page within a software application such as a mobile phone application, thus enabling convenient generation of the messaging information 118 by sender (that may be a user of the first user device 202) and viewing of the first 208 and the second 210 message by the sender and/or receiver (that may be a user of the second user device 204).

Continuing with the example, the server 102 may provide, on a display of the first user device 202, a set of user-selectable options for generation of the messaging information 118. For example, the first message 208 (referred to as, teaser message) and the second message 210 (referred to as, reveal message) may contain media files, such as images, videos, audio, animations, gifs, textual message, or a combination thereof. The teaser and the reveal message may also include, for example, URLs for other media on the Internet. In certain cases, the teaser message may also include an indication of the second access time at which the reveal message is to be made accessible to the receiver. In an example, such indication of the second access time may be implemented using a countdown timer operating in real-time. Further, the reveal message may include the reveal information.

In an implementation, the server 102 may display a plurality of animations on the display of the first user device 202, via a user interface. Further, the sender via the first user device 202, may select one or more from the plurality of animations to be transmitted as teaser message, a portion of teaser message, reveal message, or a portion of the reveal message. For example, the sender may specify the teaser message and the reveal message within fields corresponding thereto. For example, the sender may upload the teaser message, the reveal message, or a portion thereof, from a local memory of the first user device 202. Alternatively, the sender may directly create the teaser message, reveal message, or a portion thereof, on the system 100, using the first user device 202. The server 102 may also provide user-selectable options to allow the sender to, for example, preview, edit, and instantly share the teaser message.

Returning to the present example, the server 102 may provide, on the display of the first user device 202, a field for timing information 212. In this regard, the field for timing information 212 may include a sub-field for the first access time, second access time, nature of the first and the second access time, delay between the first and the second access time, and the like. The field for the first and the second access time may include, for example, a calendar control (for setting date, year) and a time control (for precisely setting the access time). Moreover, the timing information 214 may also include a field for an expiry time for any of the teaser and reveal message, after which the corresponding teaser and/or reveal message would not be accessible by the receiver. In certain cases, the server 102 may also provide a field for specifying a communication link associated with the sender.

Subsequently, the sender may submit such messaging information, wherein the server 102 receives and stores the messaging information as messaging information 118. In certain cases, the server 102 may validate the messaging information 118 before storing it. In an example, the server 102 may validate the messaging information 118 by authenticating the sender or the first user device 202 using, for example, a password, one-time password (OTP), a passcode, a captcha, and the like. For example, the server 102 may store the messaging information 118 as a program constituting instructions.

Further, the server 102 may generate a computing resource 214 for the teaser and the reveal messages. In an example, the server 102 may assign a URL to the teaser and the reveal message. In an example, the generated URL may be copied by the sender, wherein the copying of the URL may store the URL within a local memory of the first user device 202. In another example, the generated URL may be communicated to the sender using the communication link associated with the sender. Additionally, a secondary URL may be generated by system 100 and sent to the sender for subsequently editing of the two-part message. To this end, the sender may access the teaser and the reveal message after submission via, for example, by the generated URL that may be communicated or copied by the sender on generation thereof or by the secondary URL. For example, the sender may transmit the generated URL that may be communicated or copied on generation thereof to the receiver, such as via the second user device 204.

Further, the sender may access the secondary URL generated for the first and the second message, for editing or deletion thereof, or for monitoring how many times the teaser and reveal messages have been viewed by the receiver. For example, the sender may specify the first and the second access time. In such a case, the sender may edit the first message before the specified first access time is reached, and may edit the second message before the specified second access time is reached. Furthermore, the sender may also edit the timing information, specifically, the first and second access time, specified delay, calendar information, and the like. It is to be noted that such change may only be allowed before the previously specified timing information is reached.

In one example, the server 102 may be implemented as a software application or mobile phone application. In such case, the server 102 may enable the sender to directly select the receiver, based on for example, user handle of the receiver, phone number of the receiver from a local memory (for example, contacts) of the first user device 202, and the like. In this regard, the server 102 may transmit the generated computing resource (for example, URL) 214 for the teaser and reveal message to the receiver, via the second user device 204.

Continuing further, the server 102 may make the teaser message accessible to the receiver at a first access time. In an example, the first access time may be instantaneous to generation of the URL for the teaser message at the first access time. In another example, the first access time may be specified by the sender within the timing information 212. In an implementation, the computing resource 214 for the teaser and reveal messages, that is made accessible to the receiver, may include a comment section (not shown in FIG. 2). Herein, the comment section may enable the receiver to converse with the sender or other receivers of the teaser and reveal messages. In another implementation, the computing resource 214 for the teaser message may include a reminder field for enabling the receiver to set a reminder, which is triggered when second message 210 (reveal message) becomes accessible (for example, when the countdown timer reaches 0).

The server 102 may then initiate a countdown timer for the second access time at which the second message is to be made accessible. In certain cases, the countdown timer may also be indicated as a part of the teaser message (for example, at the URL of the teaser message). For example, the countdown timer may be initiated based on a nature of the second access time, i.e., if the second access time is absolute or relative. For example, in case of absolute nature of the second access time, the countdown timer may be initiated as soon as the messaging information 118 is received or the URL is generated. On the other hand, in case of relative nature of the second access time, the second access time may be dependent on the first access time or an action on the teaser message. In such case, the countdown timer may be initiated as soon as, for example, the first access time is reached, or the teaser message is accessed (or viewed) by the receiver. In one example, once the teaser message is viewed by the receiver, a time stamp corresponding to the action of viewing of the teaser message may be stored within the server 102 and the countdown timer may thus be initiated based on the time stamp.

Thereafter, when the countdown timer for the second access time reaches '0', the reveal message may be made accessible to the receiver (or the second user device 204). It is to be noted that the reveal message is made accessible after a specified delay after the teaser message. Moreover, making the reveal message accessible may enable the receiver to access the reveal message after the specified delay.

For example, after the countdown timer for the second access time reaches '0', and when the receiver may be accessing the reveal message via the second user device 204, an interim revelation media may first be played on the display of the second user device 204, prior to providing access to second message 210 (or reveal message). Such interim revelation media may be implemented as, for example, opening of a gift box, drum rolls, rocket launch, unrolling of a carpet, an icon, a fadeout, a graphic animation, a video, a GIF, or a static image, and the like. The interim revelation media may further fuel suspense and intrigue of the upcoming access to second message 210. Further, the teaser message and the reveal message may be specified within, or implemented as, a web page or a software application, such as a mobile phone application.

For example, the server 102 may enable the sender to provide (or upload) at least one of: the first message 208, the second message 210, a portion of the first 208 or the second 210 message, the interim revelation media, or other data pertaining to the messaging information. The sender may upload the data pertaining to the messaging information from a local or cloud memory of the first user device 202. In an example, the sender may upload a teaser media and a teaser animation as the first message 208, the interim revelation media and a reveal media as the second message 210.

Alternately, server 102 may provide a stock gallery of media choices for the sender to select from on the first user device for any of the aforementioned media elements.

Moreover, in an example, the server 102 may transmit an alert message to the receiver to notify the receiver when a first message 208 (or teaser message) is available for viewing. The receiver in turn may raise a request for a reminder message for when the second message 210 (or reveal message) becomes accessible. The reminder message may be transmitted by the server 102 after the second message 210 is made accessible at the second access time at the generated computing resource 214. In one example, the receiver may provide a communication link (for example, phone number, email address, account handle, a personal identifier, and the like) associated with the receiver within the reminder field to raise the request for the reminder message. For example, the reminder message may include the computing resource 214 (or URL) pertaining to the reveal message. Furthermore, the reminder message may be transmitted to the receiver as, for example, a push notification, pop-up notification, SMS, email, through a mobile phone app, and the like.

Figure 3:
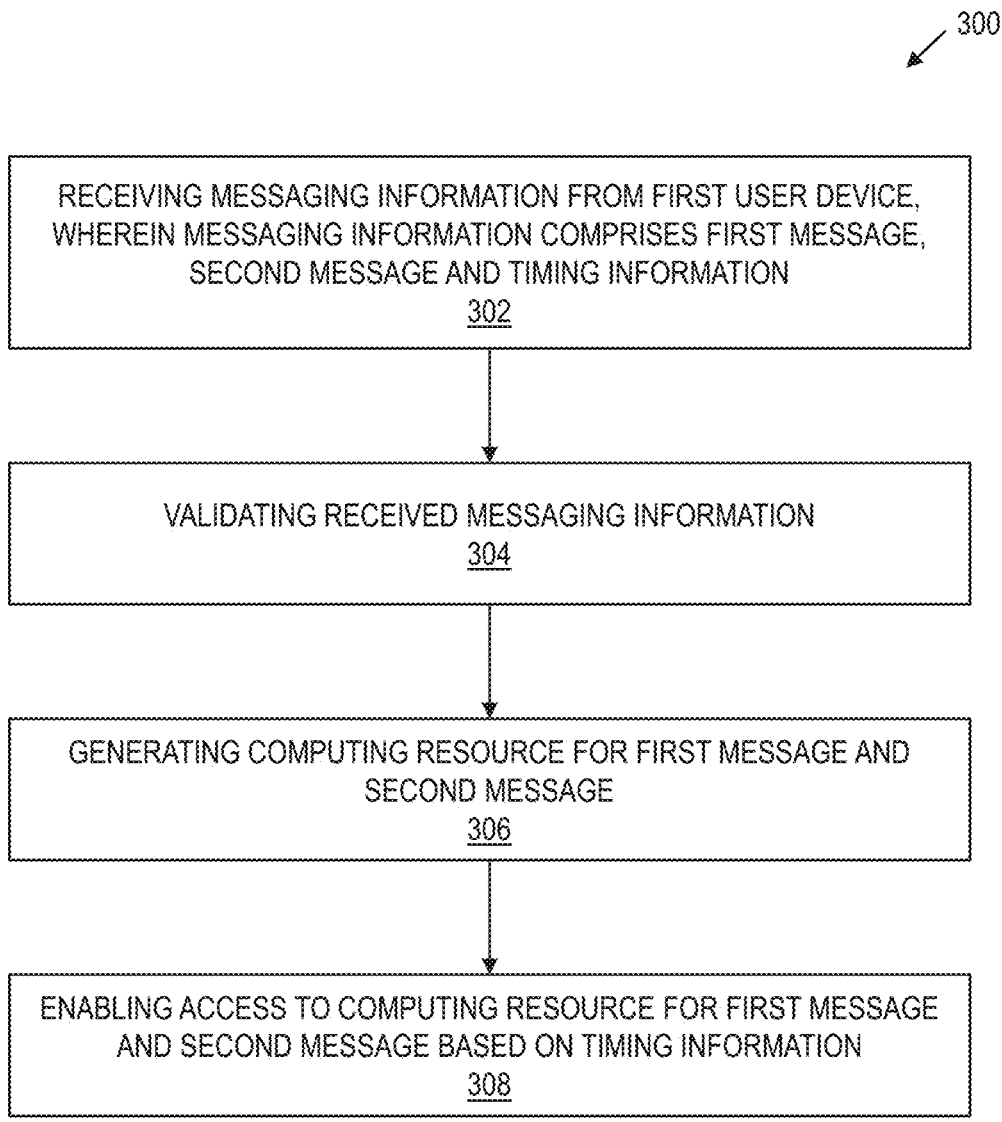
FIG. 3 is a method for messaging with a specified delay, as per an example.

Referring to FIG. 3, there is shown a method 300 for messaging with a specified delay, as per an example. The method 300 may be implemented via a system, such as the system 100. At step 302, a messaging information is received from a first user device. In an example, the messaging information may include a first message, a second message, and a timing information. At step 304, the received messaging information is validated. At step 306, a computing resource is generated for the first message and the second message. At step 308, the computing resource for the first and the second message is made accessible based on the timing information. In an example, the first message is made accessible at a first access time that is previous to a second access time at which the second message is made accessible.

The steps 302, 304, 306 and 308 are only illustrative and other alternatives can also be provided where one or more steps are added, one or more steps are removed, or one or more steps are provided in a different sequence without departing from the scope of the claims herein.

Figure 4:
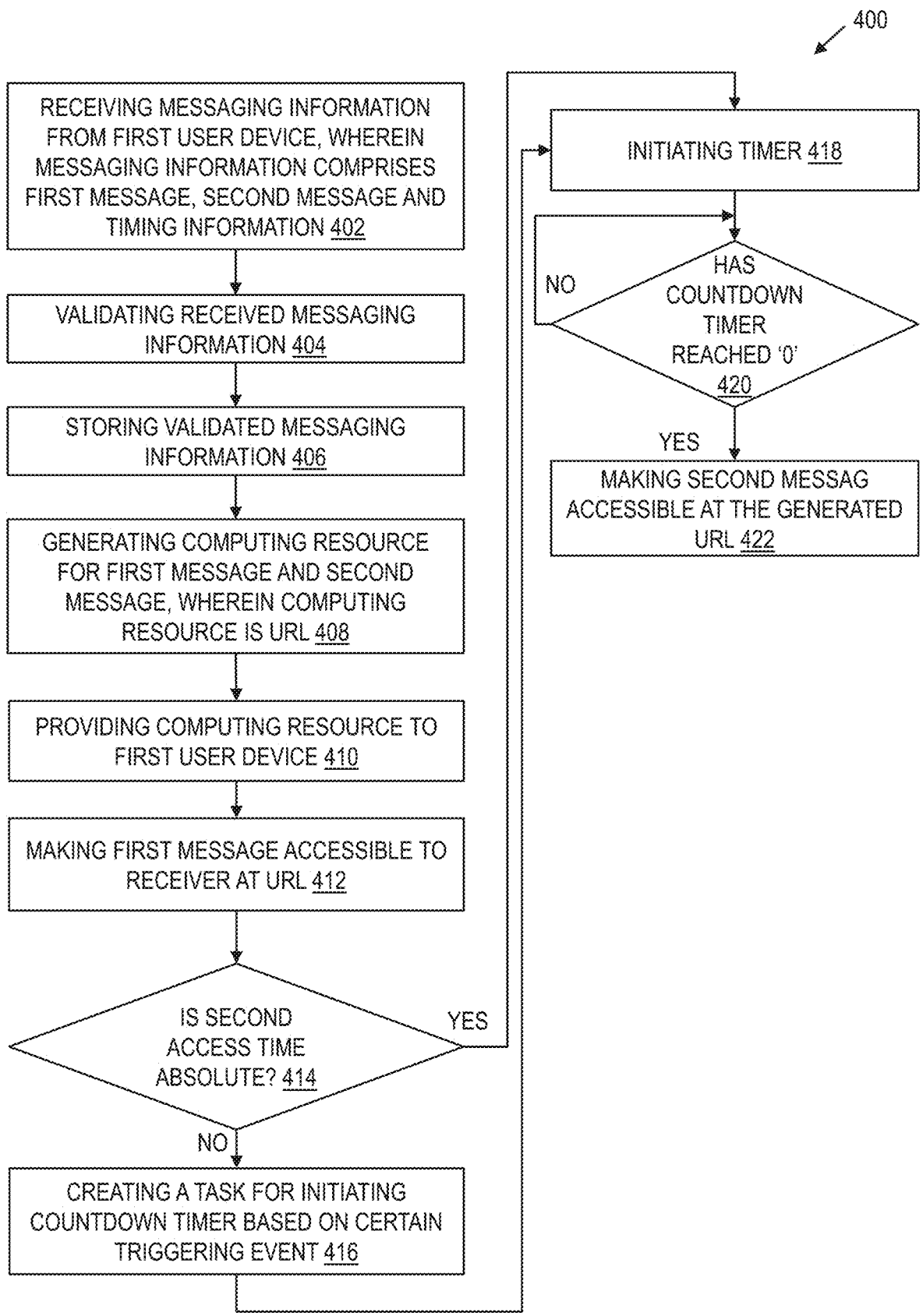
FIG. 4 is an example method for messaging with a specified delay, as per an example.

Referring to FIG. 4, there is shown an example method 400 for messaging with specified delay, as per an example. The method 400 may be implemented via a system, such as the system 100. At step 402, a messaging information is received from a first user device. The messaging information includes a first message, a second message, and a timing information. At step 404, the received messaging information is validated. At step 406, the validated messaging information may be stored within, for example, a machine-readable storage medium of the system 100. At step 408, a computing resource is generated for the first message and the second message. In an example, the computing resource may be a URL. Alternatively, the computing resource may be a screen within a software application. At step 410, the generated computing resource (for example, the URL) may be transmitted to, or copied by a sender (user of the first user device). At step 412, the first message may be made accessible on the URL, at a first access time. The URL may be provided to a receiver, by the sender. On determining the second access time, at which the second message is to be made accessible, to be not-absolute (or relative) at step 414, the system 100 may create a task for initiating a countdown timer, as specified at step 416 based on a certain triggering event, such as the viewing of the first message. However, on determining the second access time to be absolute at the block 414, the system may proceed to step 418 to initiate the countdown timer. Thereafter, at block 420, it is determined if the countdown timer has reached '0'. Moreover, once the countdown timer reaches '0', the system 100 may make the second message accessible on the URL, as shown at step 422, at a second access time specified by the sender within the timing information.

The steps 402-422 are only illustrative and other alternatives can also be provided where one or more steps are added, one or more steps are removed, or one or more steps are provided in a different sequence without departing from the scope of the claims herein.

Referring to FIGS. 5-8, there are shown illustrations of user interfaces provided by a system (such as the system 100) for messaging with specified delay, as per various examples.

Figure 5:
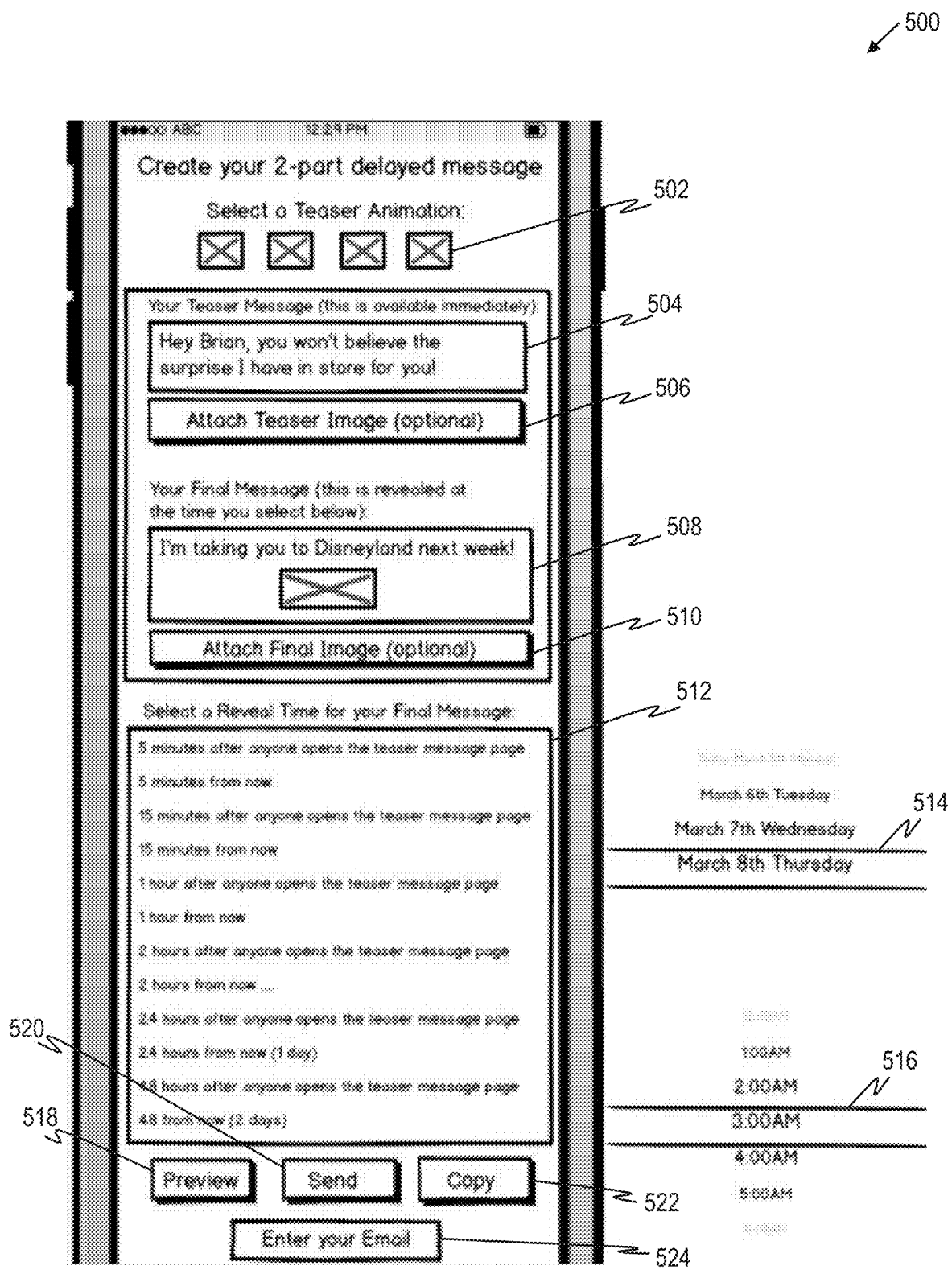
FIG. 5 is an illustration of a user interface provided by a system for messaging with a specified delay, as per an example.

FIG. 5 depicts a user interface (UI) 500 provided by a system (such as the system 100) for generation or creation of a messaging information for a two-part message, as per an example. As shown, the UI 500 includes fields 502 for selecting a teaser animation and/or interim revelation media, 504 for entering a teaser message, and 506 for providing teaser media (such as an image, animation, video, audio, and the like). The UI 500 further includes fields 508 for entering a final message (or reveal message), and 510 for providing a final (or reveal) media (such as an image, animation, video, audio, and the like). Further, the UI 500 includes a field 512 for specifying timing information, wherein the timing information may also be specified using a calendar control 514 and a time control 516. The UI 500 further provides user-selectable options for a preview 518, a send 520, and a copy 522 of the created two-part message in fields 502-516. Moreover, the teaser message including the data prescribed in fields 502, 504 and 506 are made accessible to a receiver instantly on receiving the generated computing resource or URL for the two-part message. The reveal message including the data prescribed in fields 508 and 510 are made available after the specified delay. The delay may be specified based on data in fields 512, 514 and 516.

Figure 6:
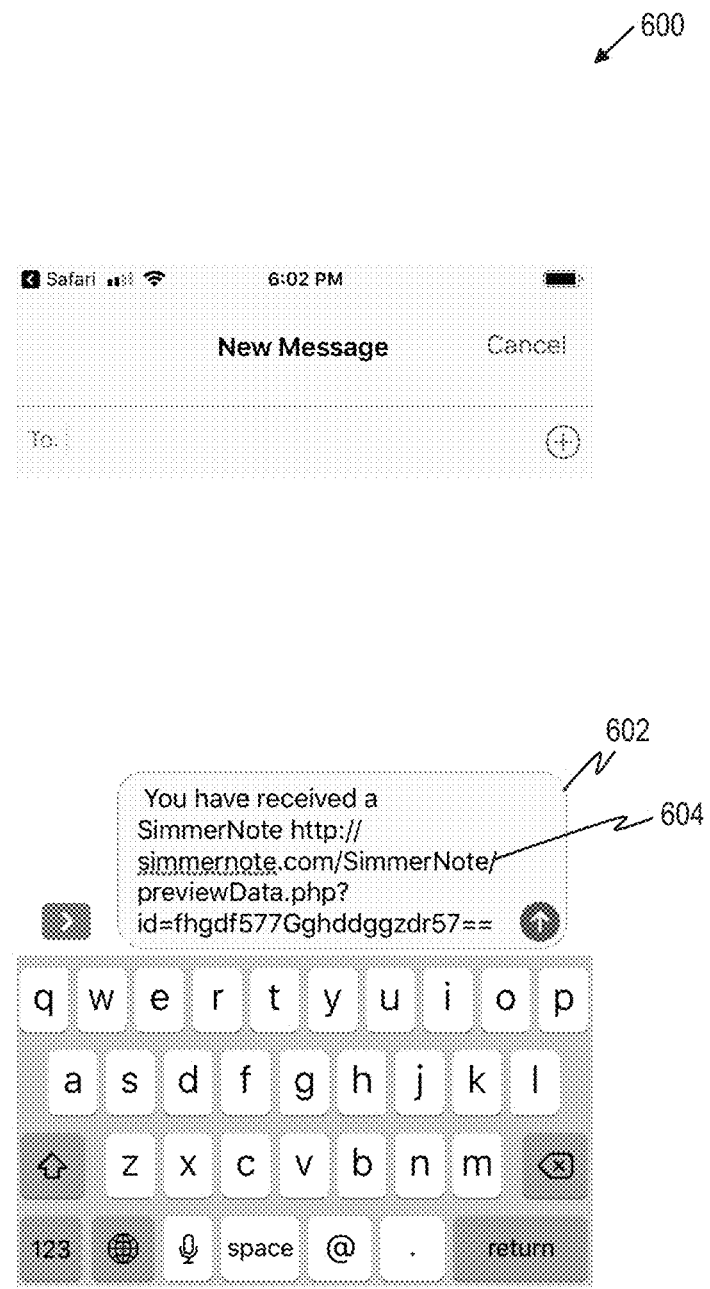
FIG. 6 is an illustration of a user interface at a first user device, as per an example.

FIG. 6 depicts a user interface (UI) 600 on a first user device, as per an example. For example, the UI 600 may be a mobile phone messaging app (such as, for sending text messages) within the first user device of the sender. As shown, UI 600 includes a standard message 602 that may be provided to the sender, in response to generation of the computing resource for the created two-part message. The computing resource may be the URL 604 that may be provided to the sender. For example, as shown in FIG. 6, the standard message 602 including the URL 604 may be communicated to the sender by server 102 in response to creation of the messaging information (such as the messaging information 118), by the sender using user-selectable options such as send 520 in FIG. 5.

Figures 7A, 7B:
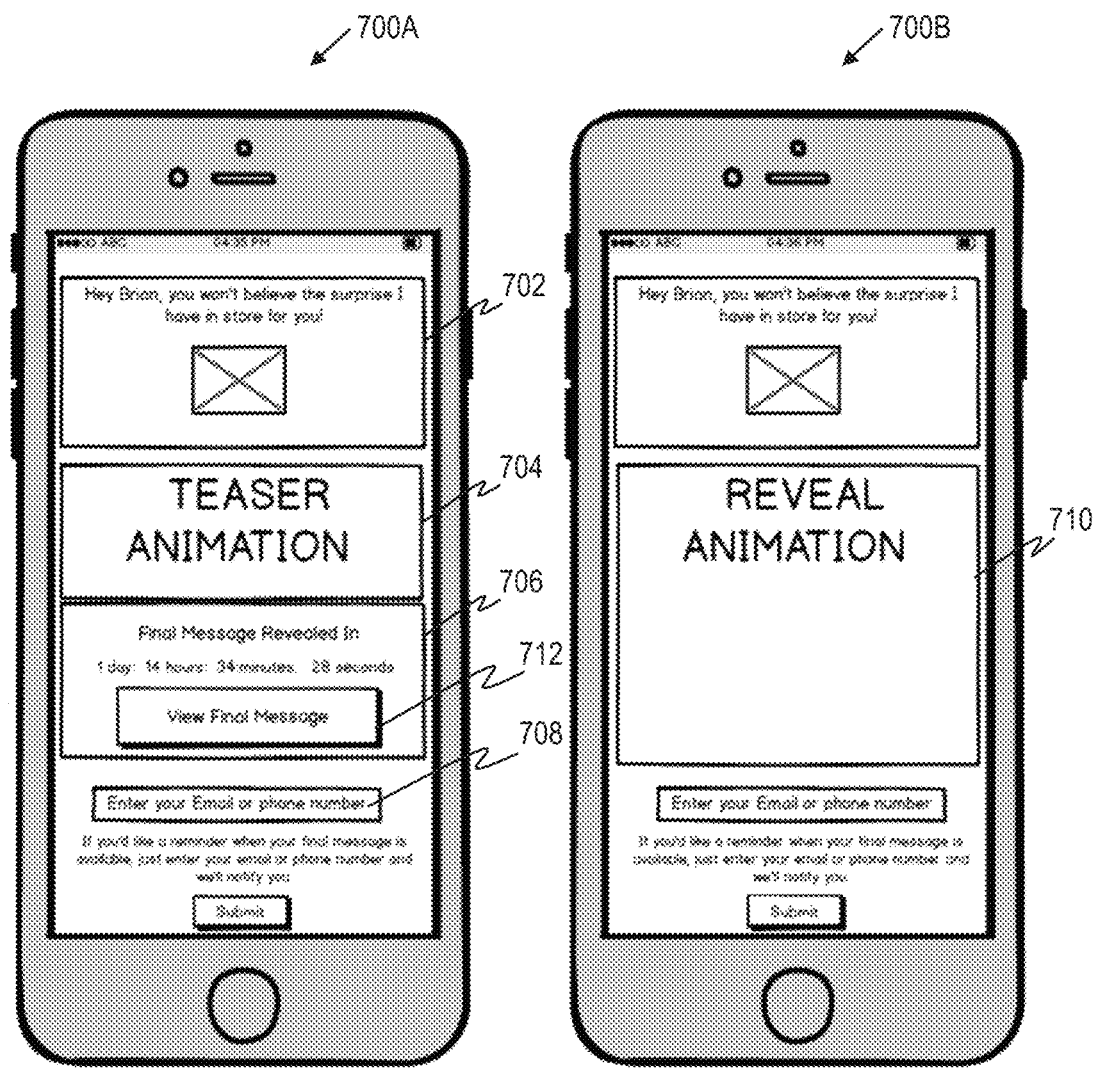
FIGS. 7A, 7B, and 8 are illustrations of user interfaces provided at a computing resource where two-part message with a specified delay is accessed, as per various examples.

FIGS. 7A and 7B depict user interfaces (UIs) 700A and 700B provided at a computing resource where two-part message with a specified delay is accessed, as per an example. The computing resource may be generated by a system (such as the system 100) on receiving a messaging information (or two-part message). The UI 700A depicts a teaser message (or first message) on the generated computing resource. The computing resource may be a URL, or alternatively, a screen within a software application. As would be understood, the URL may be implemented as a webpage. Further, the UI 700A is made accessible at a first access time. As shown, the UI 700A includes teaser message 702 and teaser animation 704. The UI 700A also includes a countdown timer 706 indicating a time at which the second message (or reveal message) is to be made accessible, and a field 708 for specifying a communication link of a receiver for setting a reminder notification as previously discussed. The UI 700B is made accessible just before or at the second access time, such as when the countdown timer 706 reaches '1' or '0'. Further, the UI 700B includes interim revelation media 710, wherein the interim revelation media functions as a suspenseful transition to the reveal message. Interim revelation media 710 may be implemented for example, as a video showing the opening of a gift box, drum rolls, rocket launch, unrolling of a carpet, an icon, a fadeout, or other transition effect, a graphic animation, other video, GIF, or static image, and the like for further fueling suspense and intrigue of the immanent access to the reveal message. Alternately, if no interim revelation media is specified by the sender, UI 700B can be skipped by system 100, so that after countdown timer 706 reaches 0, the reveal message can be immediately shown, or alternately, a reveal control 712 may be provided on the teaser message page as shown in FIG. 7A, such that when the receiver activates reveal control 712, the reveal message is then displayed.

Figure 8:
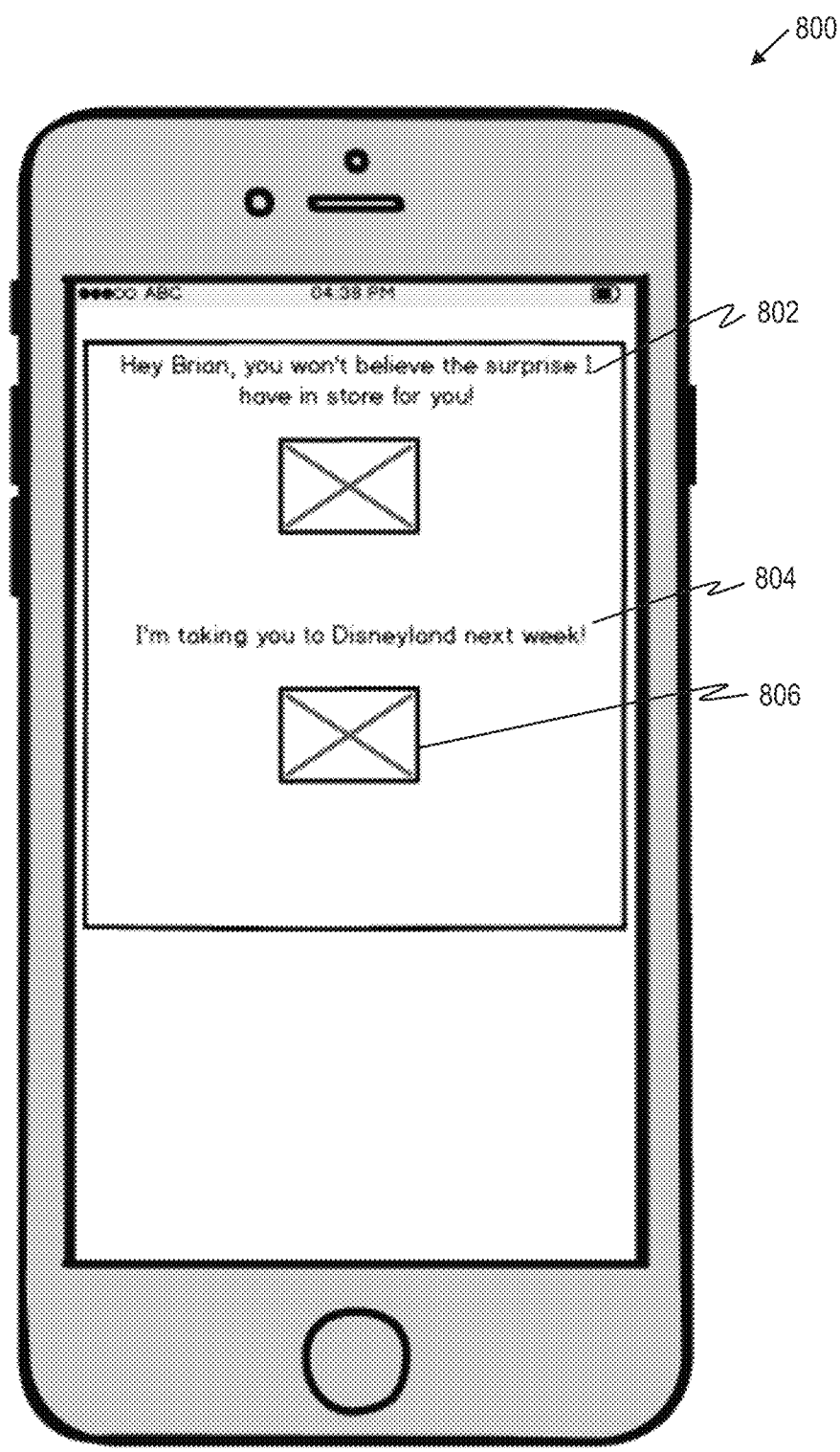

FIG. 8 depicts a user interface (UI) 800 provided at a computing resource where two-part message with a specified delay is accessed, as per an example. The computing resource may be generated by a system (such as the system 100) on receiving a messaging information (or two-part message). As shown, the UI 800, for example, a URL for the messaging information, provides access to a reveal message (or second message). Alternately, the UI may be a screen within a software application, such as a mobile phone application. Such access to the reveal message may be enabled at a second access time, or when a countdown timer (such as the countdown timer 706) reaches '0'. As shown, the UI 800 may include the teaser message 802 as well as the reveal message 804 to display the complete two-part message. For example, the reveal message in addition to any text may also include a reveal media 806, such as image, video, audio, or animation.

The present subject matter also discloses a non-transitory computer-readable medium comprising instructions executable by a processing resource for messaging with a specified delay. In an example, the non-transitory computer-readable medium may be implemented within the environment 200. The non-transitory computer-readable medium may be, for example, an internal memory or an external memory device.

Although examples of present disclosure have been described in language specific to structural or operational features and/or methods, it should be understood that the appended claims are not necessarily limited to specific features or methods described. Rather, the specific features and methods are disclosed and explained as examples of the present disclosure.

The invention claimed is:

1. A system for messaging with a specified delay, the system comprising a server, the server being coupled to at least one user device;
wherein said server comprises at least one processor and computer memory, and said server is configured to:
receive a messaging information from a first user device, wherein the messaging information comprises a first message, a second message, and a timing information;
generate a computing resource for the first message and the second message; and
enables access to the first and the second message based on the timing information, wherein the first message is made accessible at a first access time that is previous to a second access time at which the second message is made accessible;
wherein the server is further configured to:
initiate a countdown timer, based on the timing information, for access to the second message;
output the countdown timer within the computing resource for the first message; and
enable access to the second message based on said countdown timer.

2. The system of claim 1, wherein the server is further configured to provides the generated computing resource for the first message and the second message to be stored within a local memory of the first user device.

3. The system of claim 1, wherein the timing information comprises at least one of: the first access time, the second access time, a nature of the second access time, a specified delay between the first and the second access time, calendar information pertaining to the first and the second access time.

4. The system of claim 1, wherein the server is further configured to:
validate the received messaging information; and
stores the validated messaging information within a database.

5. The system of claim 1, wherein the server is further configured to provides a set of user-selectable options on the first user device, for generation of the messaging information.

6. The system of claim 1, wherein the server is further figured to enables monitoring, editing and deletion of the messaging information, via the first user device.

7. The system of claim 1, wherein the server is further configured to transmit a reminder message after making the computing resource for the second message accessible, based on the timing information.

8. The system of claim 1, wherein the computing resource comprises at least one of: a URL, a bandwidth, processing power, storage, a screen within a software application.

9. A method for messaging with a specified delay, the method comprising:
receiving a messaging information from a first user device, wherein the messaging information comprises a first message, a second message and a timing information;
validating the received messaging information;
generating a computing resource for the first message and the second message;
initiating a countdown timer, based on the timing information, for access to the second message;
outputting the countdown timer within the computing resource for the first message; and
enabling access to the second message based on the countdown timer; and
enabling access to any of the first and the second message based on the timing information.

10. A The method of claim 9, wherein the method comprises: making the second message accessible based on the timing information; and
making the first message accessible at a first access time that is previous to a second access time at which the second message is made accessible.

11. A The method of claim 9, wherein the method further comprises: providing the generated computing resource for the first message and the second message to be stored within a local memory of the first user device.

12. The method of claim 9, wherein the method further comprises:
transmitting a reminder message after making the computing resource for the second message accessible.

13. The method of claim 9, wherein the computing resource comprises at least one of: a URL, a bandwidth, processing power, storage, a screen within a software application.

14. A non-transitory computer-readable medium comprising instructions executable by a processing resource for messaging with a specified delay, wherein the processing resource:
- receives a messaging information from a first user device, wherein the messaging information comprises a first message, a second message, and a timing information;
- generates a computing resource for the first message and the second message; and
- enables access to the computing resource for the first and the second message based on the timing information, wherein the first message is made accessible at a first access time that is previous to a second access time at which the second message is made accessible;

wherein the processing resource further:
- initiates a countdown timer, based on the timing information, for access to the second message;
- displays the countdown timer within the computing resource of the first message; and
- enables access to the second message based on the countdown timer.

15. The non-transitory computer-readable medium of claim 14, wherein the processing resource further transmits a reminder message after making the computing resource for the second message accessible.

* * * * *